United States Patent
Davtchev et al.

(10) Patent No.: US 8,566,315 B1
(45) Date of Patent: Oct. 22, 2013

(54) SEQUENCED VIDEO SEGMENT MIX

(75) Inventors: Ivan Davtchev, San Francisco, CA (US); Shanmugavelayutham Muthukrishnan, New York, NY (US); Jasson Arthur Schrock, Mountain View, CA (US)

(73) Assignee: Google Inc., Mountain View, CA (US)

( * ) Notice: Subject to any disclaimer, the term of this patent is extended or adjusted under 35 U.S.C. 154(b) by 729 days.

(21) Appl. No.: 12/400,452

(22) Filed: Mar. 9, 2009

(51) Int. Cl.
 *G06F 17/30* (2006.01)

(52) U.S. Cl.
 USPC .......................................... 707/736

(58) Field of Classification Search
 None
 See application file for complete search history.

(56) References Cited

U.S. PATENT DOCUMENTS

| | | | |
|---|---|---|---|
| 5,805,733 A | 9/1998 | Wang et al. | |
| 6,526,411 B1 * | 2/2003 | Ward | 1/1 |
| 7,636,450 B1 * | 12/2009 | Bourdev | 382/100 |
| 8,055,655 B1 * | 11/2011 | He et al. | 707/727 |
| 2004/0010613 A1 * | 1/2004 | Apostolopoulos et al. | 709/231 |
| 2006/0048185 A1 * | 3/2006 | Alterman | 725/45 |
| 2008/0127270 A1 * | 5/2008 | Shipman et al. | 725/46 |
| 2008/0180391 A1 * | 7/2008 | Auciello et al. | 345/156 |
| 2009/0100456 A1 * | 4/2009 | Hughes | 725/14 |
| 2009/0259927 A1 * | 10/2009 | Fisher | 715/205 |
| 2010/0070523 A1 * | 3/2010 | Delgo et al. | 707/769 |

* cited by examiner

*Primary Examiner* — Anteneh Girma
*Assistant Examiner* — Grace Park
(74) *Attorney, Agent, or Firm* — Fenwick & West LLP

(57) ABSTRACT

A computer-implemented method and system enabling a video hosting server to create a sequenced video segment mix that summarizes video content of a collection of videos. A sequenced video segment mix is a sequential mix of popular video segments from various videos within the video collection. The sequenced video segment mix provides users an interactive medium to discover videos of interest by viewing short clips of videos within the collection that have been strategically ordered in a manner that best provides the user with a representation of the video content in the collection of videos.

37 Claims, 7 Drawing Sheets

SEQUENCED VIDEO SEGMENT MIX

TECHNICAL FIELD

The present invention generally relates to presenting videos on a video hosting website. In particular, the present invention is directed toward presenting segments of videos that summarize a video collection.

BACKGROUND

Discovering interesting videos among the millions of videos available on a video hosting website is often difficult. A video hosting website may store video content including user generated videos, videos from media publishing companies, videos of movies or events, etc. These videos are generally stored as individual entities on the website. Typically, a video hosting website allows users to access these videos by searching the website using keywords such as the name of the video, actors, content or category related to the video or by browsing in categories or channels for videos. In response, users are provided with a collection of full-length videos from which to choose.

While the conventional method exposes a user to potentially interesting videos, the user has to manually browse each video that is presented in the collection to discover videos of interest. Users do not have a good sense of the video content within the collection of videos. Thus, users waste valuable time viewing videos to determine whether a video contains interesting material.

SUMMARY

The present invention provides computer-implemented methods, systems and computer program products for creating a sequenced video segment mix that summarizes video content in a video collection that is comprised of a plurality of videos. A sequenced video segment mix is a sequential mix of video segments from various videos within a video collection. The sequenced video segment mix provides users an interactive method to discover videos of interest by viewing short clips of videos within the collection that have been sequentially ordered to provide a continuous viewing experience. A video segment represents an interesting portion of a video and each segment in the trail mix is strategically ordered in a manner that best provides the user a representation of the video content in a video collection.

In one embodiment, a video hosting server includes a video database. The video database stores videos that have been uploaded to the video hosting website. A segment module decomposes each video stored in the database into segments of short sequences. The segment module selects a segment that represents the most interesting or most popular portion of the video. A user interaction analysis module generates a video graph describing relationships between related video segments. Each node in the graph represents a video segment. The nodes in the video graph are connected by edges that represent that the two segments are related. Two video segments may be related because an interaction between the two video segments took place such that users have sequentially watched the video segments and thus the two video segments are considered related.

The nodes and edges are weighted according to various criteria such as most watched segments, most watch segment pairs, most related videos or genre. From the video graph, a segment pathway is determined based at least in part on the weighting associated with each node and edge. The resulting segment pathway represents a sequenced video segment mix that may be presented to a user responsive to a user search query.

The features and advantages described in this summary and the following detailed description are not all inclusive. Many additional features and advantages will be apparent to one of ordinary skill in the art in view of the drawings, specification and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
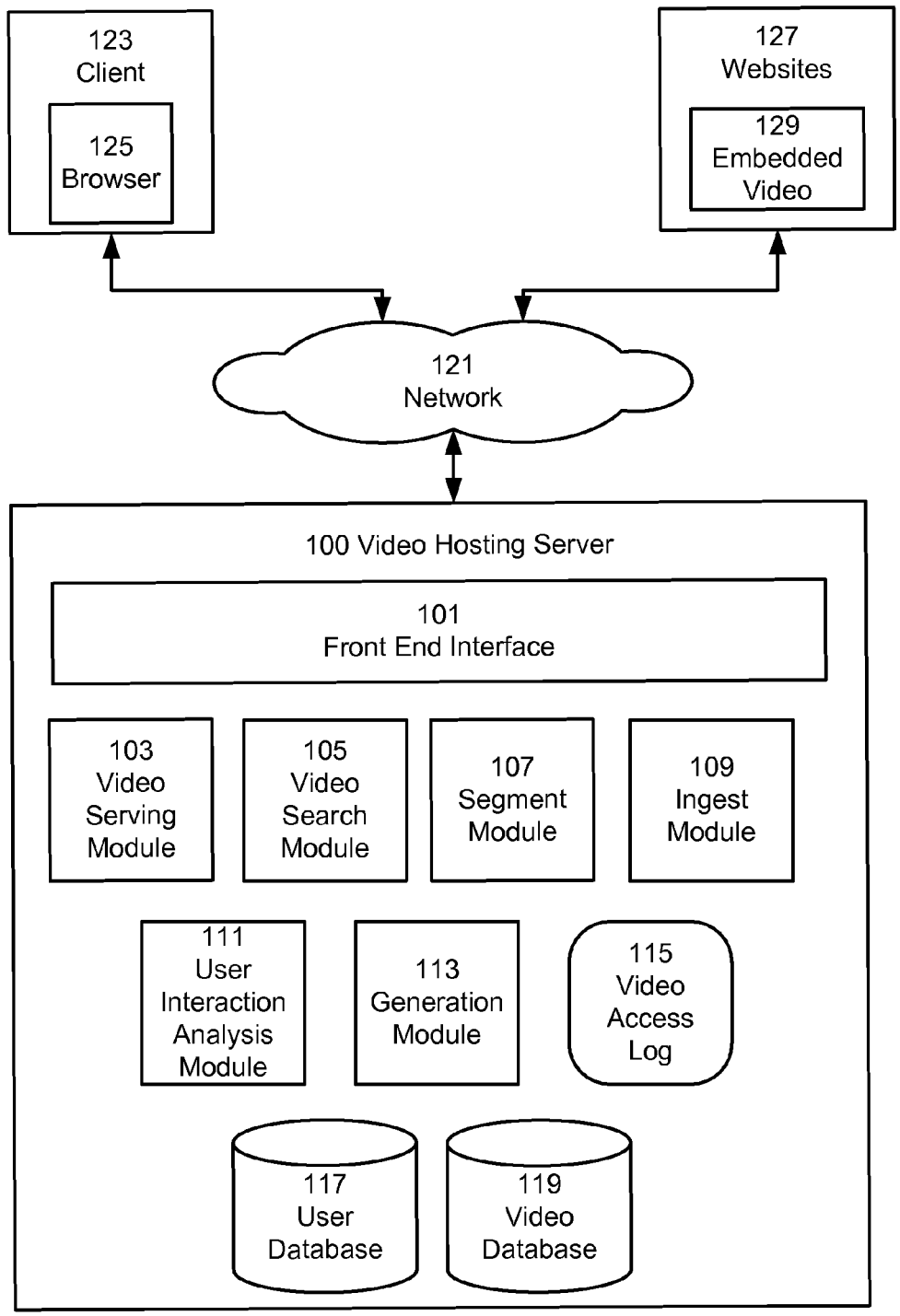
FIG. 1 is a block diagram of the system architecture in accordance with one embodiment.

FIG. 1 describes a system architecture of a video hosting server 100 in accordance with one embodiment of the present invention. Generally, the video hosting server 100 is responsible for hosting uploaded media content for display to users. In the context of the discussion, the video hosting server 100 is specifically responsible for creating a sequenced video segment mix that summarizes video content in a collection of videos.

As shown in FIG. 1, the video hosting server 100 comprises a front end interface 101, a video serving module 103, a video search module 105, a segment module 107, an ingest module 109, a user interaction analysis module 111, a generation module 113, a video access log 115, a user database 117, and a video database 119. Many conventional features, such as firewalls, load balancers, application servers, failover servers, site management tools and so forth are not shown so as not to obscure the features of the system.

A suitable website for implementation of the video hosting server 100 is the YOUTUBE™ website, found at www.youtube.com; other video hosting sites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting server 100 is implemented as server program executing on server-class computer comprising a CPU, memory, network interface, peripheral interfaces, and other well known components. The computers themselves run an operating system such as LINUX, Microsoft Windows, or Mac OS X, have generally high performance CPUs, 2G or more of memory, and 1 TB or more of disk storage. Of course, other types of computers can be used, and it is expected that as more powerful computers are developed in the future, they can be configured in accordance with the teachings here. The functionality implemented by any of the elements can be provided from computer program products (e.g., as computer executable instructions) that are stored in tangible computer-readable storage mediums (e.g., RAM, hard disk, or optical/magnetic media).

In one embodiment a client 123 executes a browser 125 and can connect to the video hosting server 100 to view media content, herein referred to as a "video," "video content" or "video items" via a network 121, which is typically the internet, but can also be any network, including but not limited to any combination of a LAN, a MAN, a WAN, a mobile, wired or wireless network, a private network, or a virtual private network. While only a single client 123 and browser 125 is shown, it is understood that very large numbers (e.g., millions) of clients are supported and can be in communication with the video hosting server 100 at any time.

In one embodiment, the client 123 may include a variety of different computing devices, some examples of which are personal computers, digital assistants, personal digital assistants, cellular phones, mobile phones, smart phones and laptop computers.

The browser 125 can include any application that allows users of client 123 to access web pages on the World Wide Web. Suitable applications are Microsoft Internet Explorer, Netscape Navigator, Mozilla Firefox, Apple Safari or any application adapted to allow access to web pages on the World Wide Web. The browser 125 can also include a video player (e.g., Flash™ from Adobe Systems, Inc.), or any other player adapted for the video file formats used in the video hosting server 100. Alternatively, videos can be accessed by a standalone program separate from the browser 125.

The browser 125 allows the user of client 123 to access videos and/or sequenced video segment mixes from the video hosting server 100 via a user interface provided by the front end interface 101. By loading the user interface in the browser 125, a user locates videos by browsing a catalog of videos, conducting searches on keywords, reviewing video lists from other users or the system administrator (e.g., collections of videos forming channels), or viewing videos associated with particular user groups (e.g., communities). The browser 125 can also access a video indirectly, for example, via an embedded video 129 that is accessed via an embedded hyperlink in a third party website 127.

Users can also search for videos or sequenced video segment mixes on the user interface based on keywords, tags or other metadata. In one embodiment, these requests are received as queries in the user interface provided by the front end interface 101 and are provided to the video search module 105, which searches the video database 119 for videos that satisfy the queries. The video search module 105 supports searching on any fielded data for video content, including its title, description, tags, author, category, comment, and so forth. The video serving module 103 retrieves videos selected by the video search module 105 from the video database 119, which is formatted into a file for transmission to the client 123.

The video database 119 is used to store videos. The video database 121 stores videos and associated metadata provided by their respective content owner who provided the videos. Each stored video is assigned a video identifier (ID) when it is processed by the ingest module 109. The videos have metadata associated with each video such as a video ID, artist, video title, label, genre, time length, and optionally geo-restrictions that can be used for data collection or content blocking on a geographic basis.

In one embodiment, the video database 119 also stores video segments associated with the stored videos. Generally, a video segment represents the most interesting portion of a video. According to one embodiment, to determine whether a portion of a video is interesting, the video hosting server 100 tracks video playback statistics for each video in the video database 119. In one embodiment, the interesting portion of a video corresponds to a portion of the video that is the most watched by users of the video hosting server 100 based on the tracked statistics. For example, for "video A," the video segment associated with the video may be the video content between the time periods of 1 minute and 2 minutes in the video because that particular section of time in the video is associated with the most-watched portion of the video.

The user database 117 stores a record of all users viewing videos provided by the video hosting server 100. In one embodiment, the user database 117 stores a record of all users who have registered an account with the video hosting server 100. Each registered account includes at least a user name and e-mail address associated with the account. A registered account may also include information about the user associated with the account such as their name, hobbies, uploaded videos and/or favorite videos.

In one embodiment, for users who have not registered an account with the video hosting server 100, each individual user is assigned a user ID, for example, based on his or her IP address to differentiate the individual users. This user ID is in one embodiment an anonymized user ID that is assigned to each individual user to keep user identities private.

For each user in the user database 117, the video access log 115 tracks the user's interactions with video segments. In various embodiments, some or all of the following data are described in each entry in the video access log 119: a video segment being accessed, a time of access, an IP address of the user, a user name or a user ID if available, web cookies or tracking cookies, the user's search query that led to the current access, and/or data identifying the type of interaction with the video segment. Interaction types can include certain user interactions in the user interface of the video hosting server 100 displaying a video segment, such as playing, pausing, rewinding and/or forwarding the video segment. The various user interaction types are considered user events that are associated with a given video segment. In alternative embodiments, user IDs many not be maintained and the video access log 115 stores certain user events regardless of whether a user ID is known.

The browser 125 also allows users to upload videos to the video hosting server 100 via the user interface provided by the front end interface 101. In one embodiment, the uploaded videos provided by users are processed by an ingest module 109 at the video hosting server 100. The ingest module 109 processes the video for storage in the video database 119. The processing can include appropriate transformations for the video content. For example, video processing can include format conversion (transcoding), compression, metadata tagging, and other data processing. The uploaded videos can include, for example, video, audio or a combination of video and audio. The ingest module 109 processes the videos in order to standardize content for playback to users of client 123. This enables the video hosting server 100 to receive uploaded videos of various formats, while still being able to provide a standardized output to users of client 123. Once uploaded videos have been formatted, the ingest module 109 stores the videos. An uploaded video is associated with the content publisher and the content publisher's account record is updated in the user database 117 as needed.

The segment module 107 decomposes each video in the video database 119 into a plurality of video segments of short sequences. Generally, once a video has received sufficient user interaction (e.g., video playback), the segment module 107 identifies one of the plurality of video segments for the video as the most popular or interesting video segment. In one embodiment, each video is associated with a single video segment that represents the most popular or more watched portion of the video while in other embodiments each video is associated with a plurality of popular video segments. The most popular video segments associated with a particular topic, genre or collection are compiled to create a sequenced video segment mix. Video segmentation will be described in further detail with reference to FIG. 3.

The user interaction analysis module 111 processes events in the video access log 115 to determine an order in which popular video segments are to be displayed in a sequenced video segment mix. Each video retrieved in response to a search query is associated with at least one popular video segment. The user interaction analysis module 111 uses the video segments associated with the retrieved video to construct a video graph that describes how the popular video segments are related to one another.

In one embodiment, the video graph includes a plurality of nodes. Each node in the graph represents a video segment. The user interaction analysis module 111 operates to identify which nodes in the graph are the most related to a starting video segment (i.e., target video segment). Generally, the starting video segment corresponds to the first video segment displayed in the sequenced video segment mix. In one embodiment, the starting video segment may be associated with the most highly rated video segment in the collection, the most watched video segment in the collection, a video segment with the most hits or a video segment viewed by the most amount of different users.

By determining which nodes are most related to the starting video segment, an order of a sequenced video segment mix is determined. The user interaction analysis module 111 determines the order of the sequenced video segment mix based on the order that a given user interacts with different video segments, as well as related video segments across all users. The cumulative data is aggregated and ranked to create a list of related video segments for a particular video segment (i.e., starting video segment). The order of video segments described in the list of related video segments represents a sequenced video segment mix.

The video database 119 stores the lists of related video segments for each stored video segment. Generally, the lists of related video segments are updated each day, in one example, with the user interaction analysis module 111 performing a daily analysis of user events from the video access log 115 and user database 117.

The generation module 113 generates sequenced video segment mixes for a collection of videos. The generation module 113 accesses the video database 119 to identify the list of related video segments associated with a starting video segment determined by the user interaction analysis module 111. Once the video segments associated with the target video are determined, the generation module 113 communicates with the video search module 105 to retrieve the video segments specified in the list from the video database 119. The generation module 113 orders the video segments as specified in the list of related video segments to form a sequenced video segment mix. In one embodiment, the generation module 113 formats the layout of the video segments to resemble a film strip that comprises a plurality of cells where each video segment is displayed in a cell.

A sequenced video segment mix is a sequential mix of video segments from various videos associated with a video collection. In one embodiment, a video collection includes a plurality of videos associated with a specific genre, topic, and/or author. One example of a video collection is a video collection about the 2008 Formula I Championship that includes a video for each race during the 2008 season. The sequenced video segment mix provides users an interactive method to discover videos of interest by viewing short clips of videos within the collection that have been sequentially ordered to provide a continuous viewing experience.

Figure 2A:
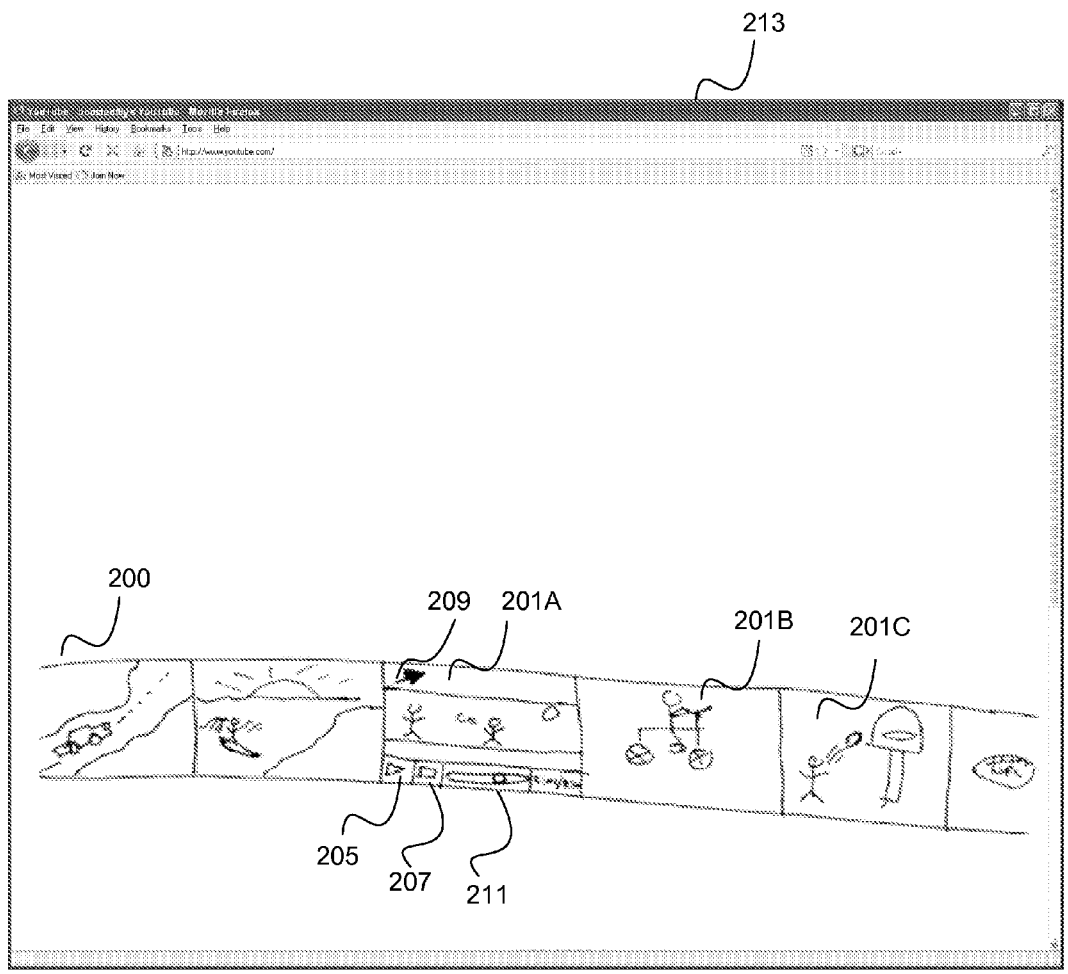
FIGS. 2A and 2B illustrate a sequenced video segment mix displayed in a user interface in accordance with one embodiment.

Referring now to FIG. 2A, there is shown one embodiment of a sequenced video segment mix 200 displayed in a user interface 213 such as a web page. In this example, the sequenced video segment mix 200 represents a collection of sports related video segments. The sequenced video segment mix 200 includes a plurality of video segments 201 that are representative of the most popular portions of the videos within the collection. Each video segment is displayed in its respective cell that represents the associated video segment according to one embodiment. In this embodiment, each cell in the trail mix 200 is aligned with another cell from the trail mix 200 in a straight line.

In one embodiment, the starting video segment 201A is initially displayed in the center of the user interface displaying the sequenced video segment mix 200 followed by video segments 201B and 201C that have been determined as the most related to the starting video segment by the user interaction analysis module 111. In one embodiment, the video segments preceding video segment 201A are the videos that are least related to video segment 201A in the collection of sports related video segments.

In an alternative embodiment, the sequenced video segment mix 200 is continuously moving from left to right or vice versa to display the video segments 201 in the sequenced video segment mix 200. Alternatively, the sequenced video segment mix 200 may be displayed vertically rather than horizontally. The sequenced video segment mix 200 may be an indefinite length limited by the number of video segments related to the starting video segment. Alternatively, the sequenced video segment mix 200 may only include a predetermined number of video segments in the trail mix (e.g., twenty video segments) and the sequenced video segment mix 200 repeats itself once all the video segments 201 have been displayed to the user. In one embodiment, users must manually scroll through the video segments to view each video segment in the collection.

As a sequenced video segment mix scrolls or shifts across the user interface, in one embodiment only a still frame image of each video segment is displayed. The user selects a video segment of interest to view. According to one embodiment, as a user hovers a cursor 209 over a video segment 201A, the sequenced video segment mix 200 stops scrolling across the user interface. Responsive to the cursor 209 hovering above a video segment for a predetermined amount of time (e.g., 1 second) the video segment begins to play the video content associated with the video segment. In one embodiment, the selected video segment is displayed inline within the sequenced video segment mix. Alternatively, clicking on the video segment of interest causes the video content associated with the video segment to play inline.

Once the video segment has finished playing, the user may watch the video segment again via the play button 205. Alternatively, after the video segment has finished playing, a popup may appear to the user asking whether the user would like to view the full-length video associated with the video segment. Now referring to FIG. 2B, by receiving an indication that the user would like to view the full length video, the full length video is displayed in a video player 215 in the user interface 213 along with the sequenced video segment mix according to one embodiment. Alternatively, by clicking a video segment, an associated full length video is displayed in the video player 215 or a new web page may be loaded in the user's browser 125 that includes the full length video. The user may also stop playback of the video segment via the stop button 207 or the user may fast forward or rewind the video segment via a video scroll bar 211.

In one embodiment, the sequenced video segment mix 200 operates as a trailer for the video segments in the collection. Each video segment 201 in the sequenced video segment mix 200 automatically plays its respective video content once the preceding video segment has finished. In one embodiment, a user may choose to watch another video segment by merely hovering over the video segment of interest or clicking on another video segment. Alternatively, a user cannot watch the video segments out of the determined order in the sequenced video segment mix 200.

Note that the trail mix shown in FIG. 2 is merely one embodiment of a trail mix. In other embodiments, the cells comprising the video segments of a sequenced video segment mix are displayed in an alternative manner to the trail mix shown in FIG. 2. For example, the cells could be aligned in a grid, column, row, circle, square or any other polygon without necessarily being arranged as a single linear unit. Any conceivable alignment of the video segments can be used such that in each embodiment there is a sequential ordering of the displayed video segments that illustrates which video segment follows or precedes any other video segment.

Video Segmentation Process

Figure 3:
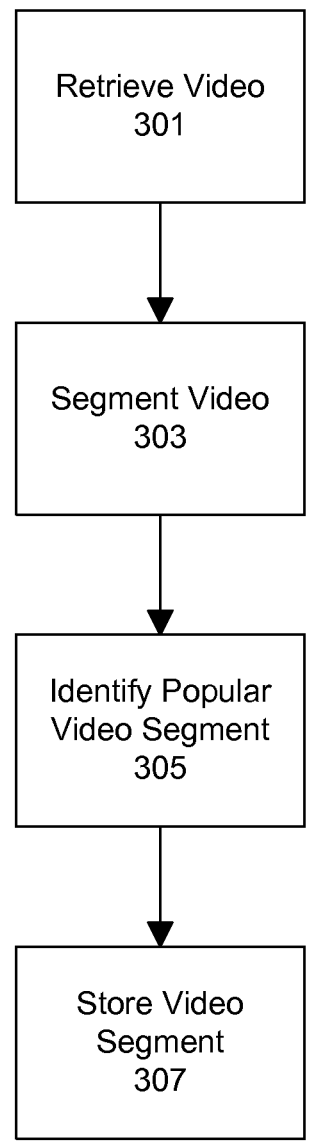
FIG. 3 illustrates a method for decomposing a video into video segments in accordance with one embodiment.

The video segmentation process of the segment module 107 decomposes or segments videos into a plurality of video segments. For each video, the segment module 107 identifies a video segment that represents the most popular portion of the video. In one embodiment, an interesting portion of a video is determined based on user interactions with the video such as the most watched portion of a video. Referring now to FIG. 3, the video segmentation process according to one embodiment has the following functional stages:

301: Retrieve Video.
   303: Segment Video.
   305: Identify Popular Video Segment.
   307: Store Video Segment.

In the first stage 301, the segment module 107 searches the video database 119 for videos without an associated video segment that represents the most popular portion of a video. Since the identification of popular video segments for videos is based on user interaction, the segment module 107 filters out videos that do not have sufficient user interaction to accurately identify the popular video segments. In one embodiment, the segment module 107 filters the videos based on various filtering criteria. The filtering criteria may be based on a minimum number of views associated with a video, a minimum number of users that have viewed with a video, an amount of time in which a video has been stored in the video database 121 or any combination of these criteria. It is appreciated that any suitable interaction criteria can be used to filter out videos.

In an alternative embodiment, the segment module 107 searches the video database 119 to locate videos with an associated popular video segment to determine whether the popular video segment needs to be replaced with another video segment that is more popular. The segment module 107 determines when the popular video segment was created for each located video and determines whether an updated video segment should be created based on an amount of time that has elapsed since that particular video segment was considered popular. For example, for any popular video segment that is greater than a month old, an updated video segment is determined by the segment module 107. This allows video segments for videos stored in the video database 119 to remain representative of the most popular portion of the videos.

In stage 303, the segment module 107 segments or decomposes videos into a plurality of video segments. That is, the segment module 107 breaks a video up into a plurality of video segments, which as a whole represent the video. Video segmentation may be performed via various methods that are known in the art, such as scene detection. Alternatively, the segment module 107 decomposes each video in the video database 119 by time segmentation. Using time segmentation, the segment module 107 divides the video into intervals of fixed time length. For example, for a video with a length of 2 minutes, the segment module 107 may generate four video segments (segments A-D) using a 30 second time interval. Segment A represents the portion of the video corresponding to the start of the video up to 29 seconds while segment B represents the portion of the video corresponding to 30 seconds of the video up to 1 minute and so on.

Once the segment module 107 has segmented a given video, in stage 305 the video segment module 107 identifies a popular video segment from among the plurality of video segments for the video. To identify the most popular video segment, the segment module 107 analyzes usage statistics in the video access log 115 to determine which portions of a video are most and least popular. In one embodiment, the segment module 107 determines from the usage statistics which portions of a video are watched more frequently. Frequently watched portions may be caused, for example, by users rewinding and watching a particular section of a video multiple times or by viewers exiting a video before the video is complete or by viewers forwarding content of a video if they want to watch a portion of the video that is a certain number of seconds, minutes, or hours into the video.

In one embodiment, the segment module 107 selects, as the representative video segment for the video, the video segment that includes all of or the majority of the most watched portion of a video. In the scenario where multiple portions of a video exist that represent the most watched portions of a video, the segment module 107 selects the video segments including those portions.

In stage 307, the selected video segment representing the most popular portion of a given video is stored in the video database 119. The video segment may be assigned a segment identification (id) that associates the video segment with the correct video in the video database 119. In one embodiment, a video segment can be a pointer to the most watched portion of the video associated with the segment. A time marker may be stored in the video database 119 that identifies the time period within a video that represents the most watched portion of the video.

User Interaction Analysis

As previously noted, the user interaction analysis module 111 constructs a video graph that comprises a plurality of popular video segments that represent a collection of videos. To determine a sequenced video segment mix, the relationship between the popular video segments in the video graph that best describes the video collection is determined. Note that there are many techniques for determining relatedness between videos. The following discussion describes only one such technique.

In one embodiment, the user interaction analysis module 111 performs a user interaction analysis process of each popular video segment in the video database 119. The relationships determined for each popular video segment allows the user interaction analysis module 111 to determine the relationships between the popular video segments in the video graph.

For each popular video segment stored in the video database 119, the user interaction analysis module 111 determines related video segments. Related video segments are pairs of popular video segments that users positively interact with within a locality of time. The user interaction analysis module 111 determines that there is a sufficient count of positive interactions between pairs of video segments across all users who have viewed the pairs of video segments within a determined time interval. Positive interactions between pairs of video segments can occur within a one hour time interval in one example.

Figure 4:
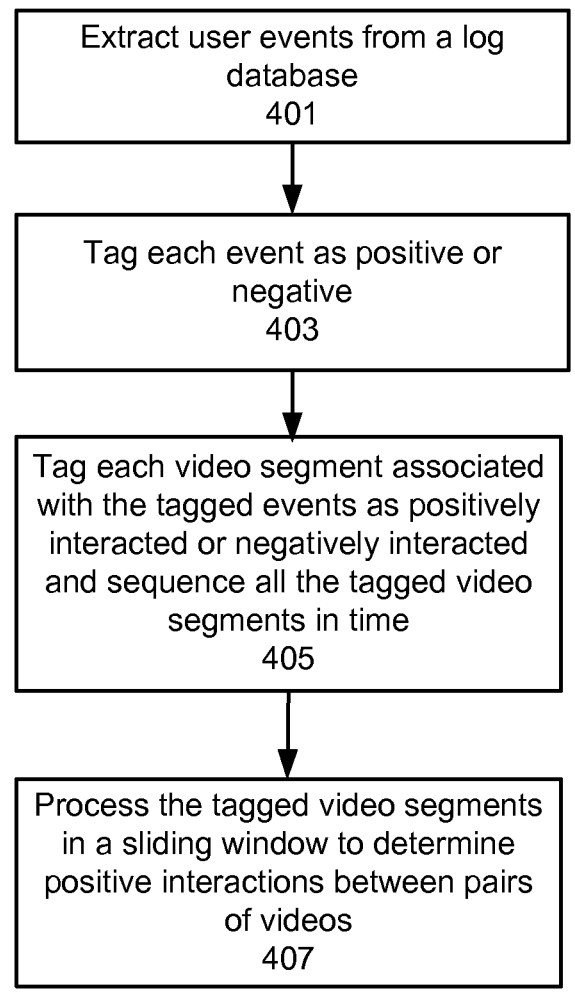
FIG. 4 illustrates a method for determining related video segments in accordance with one embodiment

Referring now to FIG. 4, the user interaction analysis process according to one embodiment has the following functional stages:

401: Extract user events from a log database.
403: Tag each event as positive or negative.
405: Tag each video segment associated with the tagged events as positively interacted or negatively interacted and sequence all the tagged videos in time.
407: Process the tagged video segments in a sliding window to determine positive interactions between pairs of videos.

Figure 2B:
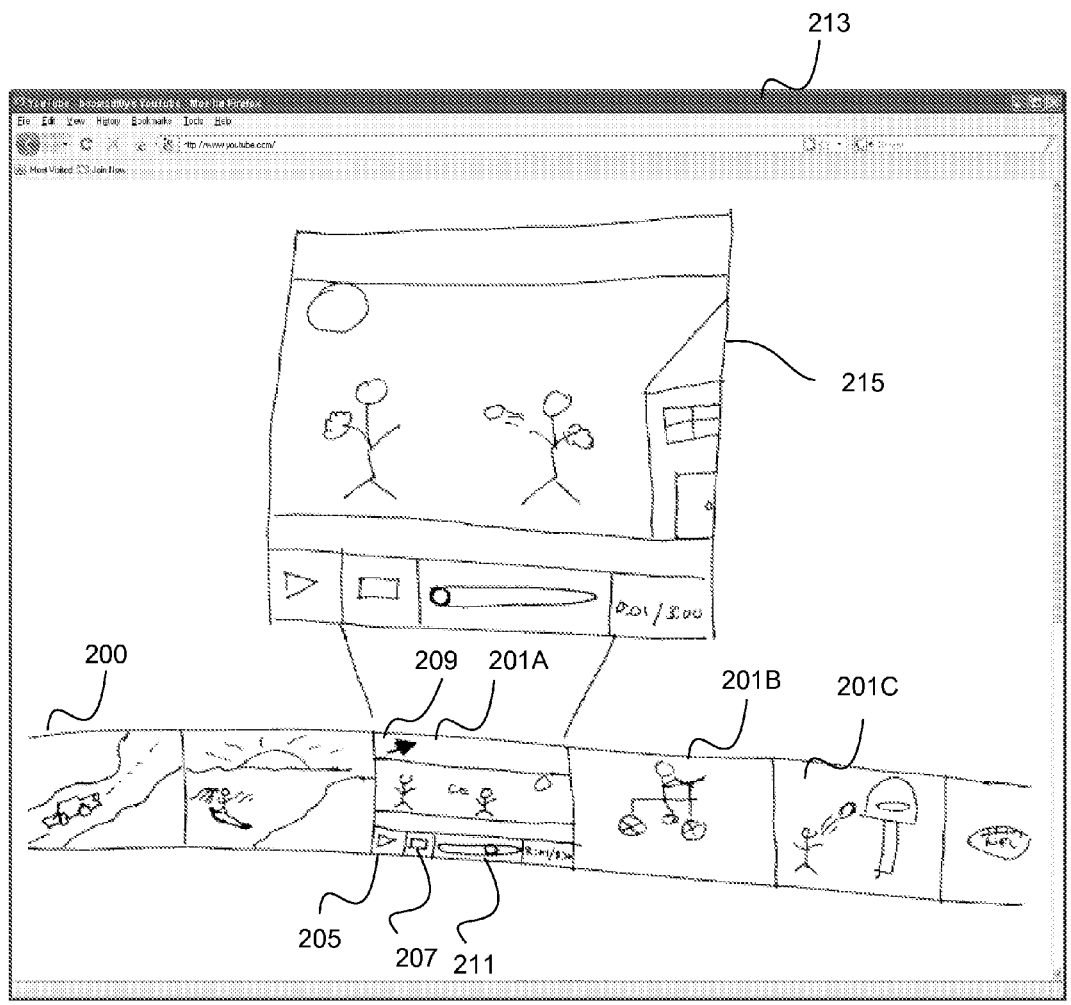

The first stage 401 is a process repeated for each user having a registered user name or a user ID in the user database 117. For a given user, the user interaction analysis module 111 extracts events from the video access log 115. As a user interacts with the user interface of the video player that displays video segments within the sequenced video segment mix 200 as shown in FIG. 2A, the video access log 115 stores specified interactions as events. For every video segment, a record is kept of specific user interactions with the video segment via the user interface while watching the video segment. A user interface for viewing a video segment can be, for example, the video player within the sequenced video segment mix 200 that displays video segment 201A as illustrated in FIG. 2A or the video player 215 that allows users to watch videos on the video hosting site provided by the video hosting server 100 as illustrated in FIG. 2B.

The user interactions include use of any of the controls for video segment playback (e.g., play, pause, forward, rewind) that occur during the viewing of the video segment. Each interaction is associated with a specific location in a video (e.g., time offset, timestamp, or time code) that can be used, in one example, to tag events as either positive or negative interactions. For example, when a playback interaction is stored, a time offset indicating the continuous time duration in which the video segment was played in the video player is associated with the playback event.

Each specified user interaction is stored as an event in the video access log 115. The video access log 115 stores all specified user interactions for all popular video segments stored in the video database 119. Each event entry in the video access log 115 includes the user name or user ID of the user viewing the video and the video segment ID to associate the event with a particular video segment. The user name or user ID differentiates the user events for each individual user and is used in the user interaction analysis further described below.

In step 403, the user interaction analysis module 111 extracts user events stored in the video access log 115 for a given user. The extracted list of stored events is used in the second stage of the user interaction analysis.

At step 405, the user interaction analysis module 111 tags the extracted events as either a positive or negative interaction. In one example, an event can be tagged "1" representing a positive interaction and can be tagged "0" representing a negative interaction. Tagging events "1" or "0" is merely illustrative of one method to tag events and any real-valued or discrete function can be used.

An event is determined to be positive or negative based on various factors. For example, for a playback event, the user interaction analysis module 111 determines the time offset of the playback event. If the time offset in which the video segment was continuously played is equal to the length of the entire video segment, the playback event is tagged "1" indicating a positive event since the user viewed the entire video segment. Alternatively, if the ratio of the video segment watched versus the length of the entire video segment is greater than 75% than the playback event would be tagged "1" indicating a positive event. In other embodiments, if the user has viewed the video segment for a predefined length of time regardless of the video segment length, the event is tagged "1." For example, a user may have viewed a video segment for a total duration of 1 minute, but the video length is only 20 seconds long. This implies that the user viewed the video segment multiple times so the event would be tagged "1."

A high rating by the user of a video segment, e.g., five stars out of five, is treated as a positive event in one embodiment. A threshold may be used to determine a rating level that is sufficiently high to be treated as a positive event, for example a rating of three or more out of five stars. A rewind event to an earlier part of the video segment, or to its beginning is another indication of a positive event. Rewinding the video segment indicates that the user wants to watch the video segment again, thus enabling the positive inference.

A negative event can occur if the user viewed only a small portion, e.g., 25%, five seconds, etc., of the entire video segment before playback was stopped; or if the user provided a low rating of the video segment such as one out of five stars. Analysis of text comments, audio comments, or video comments can also be used in some embodiments to determine whether to tag an event as positive or negative. Any discernable interaction with the website that illuminates the user's satisfaction with the video segment can be used to tag events as either positive or negative by correlating the semantics of the interaction with user intent. Upon completion of this stage, the user interaction analysis module 111 has a list of tagged events for the user. This list of events may be time-delimited (events in the last month or week, for example), or for all events by the user.

The third stage 406 of the user interaction analysis process determines if a video segment was positively or negatively interacted with by a user by evaluating the tagged events associated with the video. Specifically, the user interaction analysis module 111 determines if a positive interaction of a video segment occurred by evaluating the tagged events associated with a video ID. Certain events automatically indicate a video segment was positively interacted with. For example, if a playback event, as described above, indicates the user continuously viewed the entire video associated with the video segment, then the video segment was positively interacted with. The user watching the entire video implies satisfaction in the video segment because the user took the time to view the video associated with the video segment in its entirety.

Alternatively, a high rating of the video associated with the video segment implies user satisfaction with the video segment. These events automatically designate that the particular video segment being analyzed by the user interaction analysis module 111 was positively interacted with by the user. The video segment is then tagged with a "1" indicating the positive interaction. Additionally, videos can be positively interacted with when the user rewinds the video associated with the video segment and replays a part of the video or if a user leaves a positive comment about the video.

Video segments can also be automatically tagged as negatively interacted with, based on certain events indicating a negative interaction. For example, if a watch ratio, e.g. the ratio of the play time to the length of the video segment, is less than a predetermined value, such as 25%, the event indicates that the user did not have a positive interaction and the video segment is tagged as negatively interacted with. Alternatively, if the video access log 115 includes an event associated with the user giving a low rating to the video segment, such as 1 out of 5 stars, for example, the low rating event indicates that the user did not have a positive interaction with the video segment and the video segment is tagged as being negatively interacted with. Additionally, a video segment can be automatically tagged as being negatively interacted with if a user leaves a negative comment about the video segment.

Once all the videos in the video access log 115 associated with a particular user or anonymized user ID have been tagged as either positively or negatively interacted with, the tagged list of video segments are sequenced in time (e.g., by the time of the first user interaction) by the user interaction analysis module 111 to create a sequenced list of tagged videos. The tagged list of sequenced video segments identifies video segments that a user viewed chronologically in time indicating the video segments the user had a positive interaction with and video segments that were negatively interacted with. By analyzing the tags associated with pairs of video segments in a sliding window, the user interaction analysis module 111 determines pairs of video segments that were positively interacted with. Generally, when two video segments are both positively interacted with within a selected time interval, then the video segments are deemed to be related.

An example of the sequenced list of tagged video segments is as follows:

| Video Segment | Tag |
|---|---|
| $V_1$ | 1 |
| $V_2$ | 1 |
| $V_3$ | 0 |
| $V_4$ | 1 |

In the above example of the sequenced list of tagged video segments, the column "Video Segment" represents the various video segments a user has viewed in the order of viewing based on time stamps stored in the video access log 115, where $V_1$, $V_2$, etc represent the individual video segments that have been watched by the user. The "Tag" column is representative of the associated video segments being tagged as either having a positive interaction (1) or having a negative interaction (0). The tagged video segments are sequenced in the order that the segments were watched by the user in order for the user interaction analysis module 111 to process the tagged videos in a sliding window.

The fourth stage 407 of the user interaction analysis processes the tagged video segments in a sliding window as shown in the example below:

| Video Segment | Tag |
|---|---|
| $V_1$ | 1 |
| $V_2$ | 1 |
| $V_3$ | 0 |
| $V_4$ | 1 |

The user interaction analysis module 111 utilizes a sliding window as one way of establishing a time interval, depicted by the rectangle enclosing the first three tags, to analyze the interaction tags to determine if a pair of popular video segments was positively interacted with by a user. The sliding window is iteratively advanced through the sequence of interaction tags for the user, and each pair-wise combination of the first video segment in the window with each other video segment in the window is analyzed. All interaction tags within the sliding window are said to co-occur. Generally, the user interaction analysis module 111 identifies pairs of video segments $(V_i, V_j)$ where both video segments are positively interacted with, that is where tags $T_i=T_j=1$. Each time a pair of video segments $(V_i, V_j)$ is positively interacted with, a co-occurrence matrix, as further described below, stores the positive counts of interactions between the pair. Any other combination of interactions, such as tag pairs (1,0), (0,1) and (0,0), do not indicate a positive relationship between the two video segments under consideration and are not reflected in the co-occurrence matrix.

In the above example, the sliding window allows for analysis of related video segments for the target video segment, which in this example is $V_1$. The interaction tags of the first and second video segments ($V_1$ and $V_2$ respectively) in the list are the first pair of tags to undergo analysis. In the case of $V_1$ and $V_2$, $V_1$ is tagged "1" which indicates the video segment was positively interacted with and $V_2$ is also tagged "1" indicating the video segment was also positively interacted with. Each of the pair of video segments was tagged "1", which indicates a positive interaction between the pair of video segments. Thus, $V_1$ and $V_2$ had co-occurring positive interactions. In the case of $V_1$ and $V_3$, $V_1$ is tagged "1" which indicates the video segment was positively interacted, but $V_3$ is tagged "0" which indicates a negative interaction with the video segment. Thus, this pair does not indicate a positive relationship between $V_1$ and $V_3$.

The sliding window below is an example of the sliding window analyzing the next target video segment, in this case the target video segment is $V_2$, with the possible video pair combinations with $V_3$ and $V_4$.

| Video Segment | Tag |
|---|---|
| $V_1$ | 1 |
| $V_2$ | 1 |
| $V_3$ | 0 |
| $V_4$ | 1 |

Here, video segment pair $V_2$ and $V_3$ have a tag sequence of (1, 0) respectively, which does not indicate a positive relationship. The next pair combination with the target video segment for analysis is $V_2$ and $V_4$ which has a tag sequence of (1, 1) respectively, thus indicating a positive interaction was made with both videos which were sequentially viewed in time. Thus, $V_2$ and $V_4$ had co-occurring positive interactions.

The above example of the sliding window with three videos is a very simplified one for purposes of explanation only. Any number of methods to determine positive co-occurrences between videos can be used. More generally, the sliding window represents a time interval for identifying co-occurring positive interactions for pairs of videos. The sliding window can be implemented with either a fixed time length, or a variable time length. In one embodiment, the sliding window size is one hour so that only pairs of video segments viewed within one hour of each other are analyzed for positive interactions. Generally, when users are watching video segments, multiple video segments are viewed and the video content from the first video segment watched in the time session compared to the last video watched can differ greatly. Using a time window of one hour increases the likelihood that the video segments in the sliding window are still related to one another.

Once the user interaction analysis process completes for an individual user, the user interaction analysis process as previously discussed above in reference to FIG. 4, will be performed for all (or some selection of) users listed in the user database 117. After the user interaction analysis process is complete for the selected users, the co-occurrence matrix holds the updated the positive interaction counts between pairs of videos.

A co-occurrence matrix is used to store counts of positive interaction co-occurrences for each pair of popular video segments in the video database 119. Each time a pair of video segments ($V_i$, $V_j$) has a positive relationship (e.g., a pair of positive interactions), the interaction count for the pair is updated. The interaction counts are preferably incremented only uni-directionally, that is the count for ($V_i$, $V_j$) is incremented, but not for ($V_j$, $V_i$) where the positive interaction with $V_i$ precedes the positive interaction for $V_j$. Alternatively, the counts can be incremented bi-directionally, with the counts for both ($V_i$, $V_j$) and ($V_j$, $V_i$) updated. The co-occurrence counts will be used to rank the list of related video segments, which is further described below. A simplified example of the co-occurrence table that is created by the user interaction analysis module 111 is as follows:

| Any Video Segment | Related Video Segments | | | |
| --- | --- | --- | --- | --- |
| | $V_a$ | $V_b$ | $V_c$ | $V_d$ |
| $V_a$ | — | 15 | 2 | 30 |
| $V_b$ | 1 | — | 50 | 9 |
| $V_c$ | 2 | 1 | — | 20 |
| $V_d$ | 20 | 30 | 25 | — |

The table above depicts a co-occurrence table of the type stored in the video database 121, although greatly simplified here for clarity of explanation. The video segments $V_a$ through $V_d$ are illustrative of the total video segments stored in the video database 119, though any number of video segments can be stored up to the limits of the particular computing environment. For any given video segment, such as $V_a$, a count (or real value) is maintained of every instance a positive interaction occurred between $V_a$ and related video segment $V_b$ through $V_d$ during the fourth stage 408 of the user interaction analysis process. The count is maintained across all users in the user database 117, thus the related video segments table represents all positive interactions between pairs of video segments. In the example above, video segment $V_a$ was positively interacted with video segment $V_b$ 15 times while $V_a$ was positively interacted with video segment $V_c$ only 2 times. The positive interaction counts are analyzed by the user interaction analysis module 111 to generate a ranked list of related video segments for any given video segment, as further described below.

In an alternative embodiment, real number weights are used to update the co-occurrence counts, by weighting the interaction tags for video segments according to a distance measure between the two video segments. One method of weighting the interactions is to use position distance within the sliding window, as follows. Within the sliding window, there is the target video segment (e.g., the first video segment) and each of the remaining video segments, the second through Nth video segment. Each video segment (or position in the list) is given a weight, starting with a highest weight (1) for the second video segment, and scaled through the Nth video segment over a range from the maximum weight of 1 to a minimum weight. The weighting can be a step function, a linear function, a logarithmic function, or some other function.

For example, in a sliding window of 5 videos, a step function would weight the video segments with values of 0.9, 0.8, 0.7, and 0.6, for the second through fifth video segments respectively. When updating the co-occurrence count for a pair of video segments ($V_i$, $V_j$), the count is updated by the weight for video segment $V_j$. This reflects that the greater the temporal separation between the two video segments, the less significant is the positive relationship between them deemed to be.

Alternatively, the weights can be decayed using a distance measure based on time. The weight of the interaction can be inversely related to the length of time between the time the target video segment was viewed and the time the second video segment was viewed. Alternatively, the weight can be inversely proportional to the length of time between when the second video segment was viewed and the current time when the analysis is being performed.

The user interaction analysis module 111 analyzes the co-occurrence table to generate a ranked list of related video segments for any given video segment. The ranking can be based on any number of criteria. In one embodiment, the ranking occurs based on the total amount of positive interactions. For example, for a given row, representing a video segment (e.g., $V_a$), the video segments listed therein can be sorted by their interaction counts, from highest to lowest. This forms a list of video segments that are related to the target video segment.

Alternatively, the related video segments can be ranked based on the total accumulated time watched for each related video segment. Because each count of positive interaction is associated with a particular user in the user database 125, the user interaction analysis module 113 can determine the total amount of time a related video segment was viewed by all users by retrieving the playback event data from the video access log 115.

This method of ranking the related videos is beneficial because though a particular video segment had the most counts of positive interactions it may not necessarily be the most related video segment. The video segment may have just met the minimum criteria to be determined positively interacted with in the third stage 406 of the user interaction analysis process amongst all the users, whereas another related video segment may have had a lower amount of positive interactions, but each user who had a positive interaction with the related video segment watched the video entirely. This method takes into account the playback event, which is one of the most significant events that indicate a positive interaction with a video segment.

The ranked list of related video segments for all videos is stored in the videos database 119. The ranked lists of related video segments is used by the user interaction analysis module 111 to determine the relationships between video segments represented in a video graph constructed by the user interaction analysis module 111. The user interaction analysis module 111 determines a segment pathway between the video segments in the video graph based on the ordering of related video segments described in the ranked lists of related video segments. The segment pathway illustrates the display order of video segments in a sequenced video segment mix as will be described in further detail below.

Other computer-implemented methods can be used to weight the co-occurrence counts between video segments for ranking purposes and other methods for ordering the sequenced video segment mixes can be used. For example, exploration-exploitation methods can be used to determine when new video segments are shown to users so that the users' interactions with the video segments will determine how that segment will be incorporated in the sequenced video segment mix in the future. Furthermore, the embodiments described herein are orthogonal to and can be combined with a content analyses approach that uses computer vision to understand the contents of video and to extract features and relationships between video segments. The extracted features and relationships between video segments can be used as the basis for the ordering of sequenced video segment mixes.

Sequenced Video Segment Mix Generation

Figure 5:
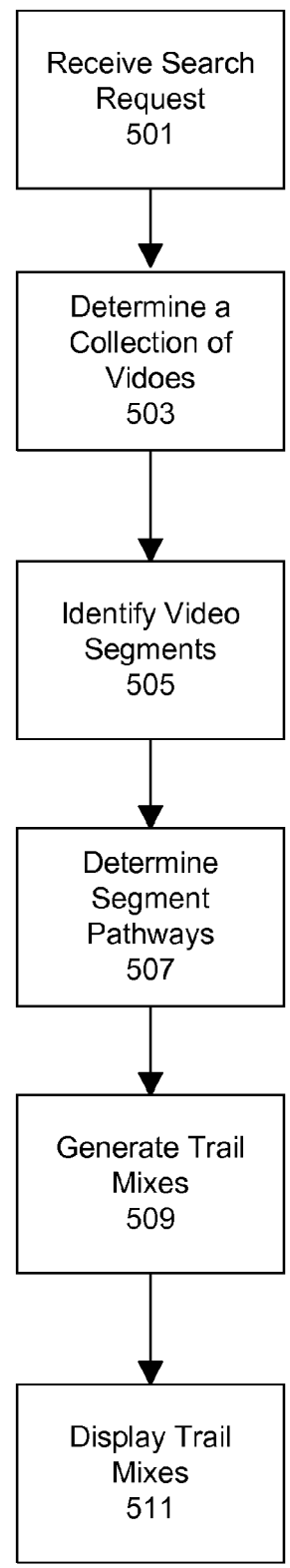
FIG. 5 illustrates a method for generating a sequenced video segment mix in accordance with one embodiment.

FIG. 5 illustrates a method of generating a sequenced video segment mix according to one embodiment. Video search module 105 receives 501 a search request for a collection of videos related to a search term (i.e., keyword) such as "2008 Formula One Championship." The video search module 105 searches the video database 119 to determine 503 a collection of videos that includes content related to the search term. The video search module 105 creates a set of video segments by identifying 505 a frequently watched video segment or popular video segment for each video in the video collection. Once the set is created, the user interaction analysis module 111 determines 507 segment pathways that describe the order in which the video segments will be displayed in a sequenced video segment mix. To determine the segment pathways, the user interaction analysis module 111 constructs a video graph(s) that illustrates possible segment pathways.

Figure 6C:
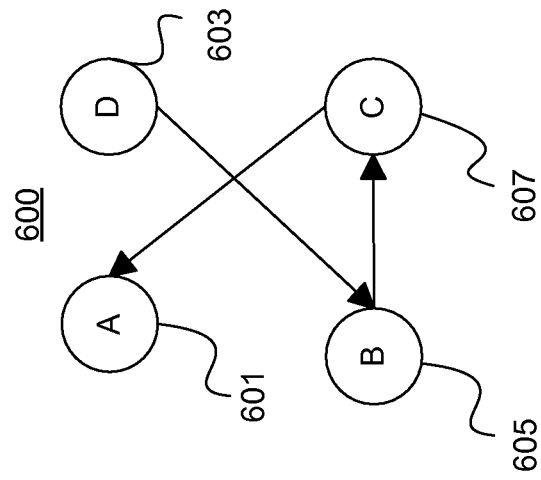
FIGS. 6A, 6B and 6C illustrate a video graph in accordance with one embodiment.
Figure 6B:
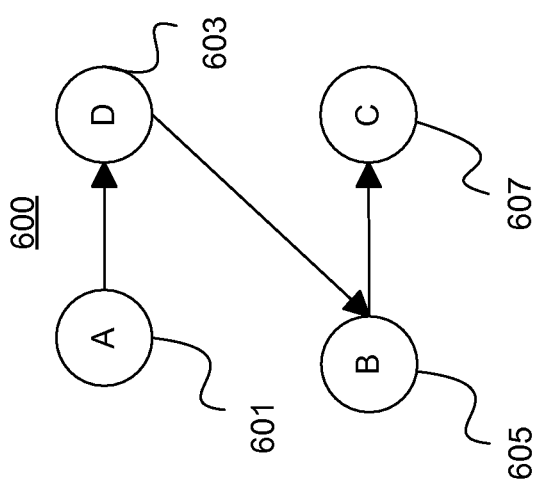
Figure 6A:
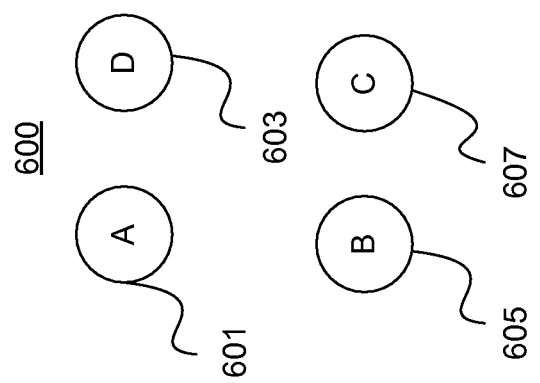

Referring now to FIG. 6A there is shown one embodiment of a collection of video segments in a video graph 600. The video segments in the video graph 600 represent the popular video segments identified by the video search module 105 in step 503. Each identified video segment represents a node in the video graph 600 The collection of video segments includes video segment A 601, video segment B 605, video segment C 607 and video segment D 607. While only a relatively small number of identified video segments related to the search request is shown in FIG. 6A, it is understood that any number of video segments can be identified.

The user interaction analysis module 111 determines 507 segment pathways from the identified video segments. As shown in FIG. 6A, a segment pathway is not initially determined for the identified video segments. The user interaction analysis module 111 determines a segment pathway by first selecting a starting video segment that is the basis from which the order of the video segments is determined. The starting video segment is selected based on various user interaction criteria such as the segment associated with the most amount of time watched by viewers, the highest rated video segment from the identified video segments, the video segment with the most views, or the video segment with the highest number of different users who have viewed the video segment. Any appropriate criteria can be used to select the starting video segment.

Once the user interaction analysis module 111 has selected the starting video segment, the user interaction analysis module 111 identifies the ranked list of related video segments associated with the determined starting video segment. As previously mentioned, the ranked list of related video segments illustrates an ordered list of video segments that are related to a target video segment. From the ranked list of related video segments, the user interaction analysis module 111 constructs a segment pathway in the video graph based on the ordering of related videos indicated in the ranked list.

FIG. 6B illustrates a segment pathway when video segment A 601 is determined to be the starting video segment since video segment A, for example is associated with the highest ratings among the video segments in the collection. In this example, the segment pathway has a video segment ordering of video segment A 601, video segment D 603, video Segment B 605 and video segment C 607.

In one embodiment, the user interaction analysis module 111 determines a plurality of segment pathways for each user interaction criteria mentioned above. For example, FIG. 6C illustrates a segment pathway when video segment D 603 is determined to be the target video since video segment D 603 is associated with the most views among the video segments in the collection, for example. In this example, the segment pathway has a video segment order of video segment D 603, video segment B 605, video segment C 607 and video segment A 601.

Referring back to FIG. 5, after the segment pathways are determined, the generation module 113 generates 509 sequenced video segment mixes based on the determined segment pathways. The generation module 113 communicates with the video search module 105 to retrieve from the video database 119 the video segments required to generate sequenced video segment mixes associated with the determined segment pathways. For each segment pathway, the generation module 113 compiles the video segments included in the segment pathway into a sequential ordering indicated by the segment pathway of each video graph. In one embodiment, the generation module 113 visually groups each video segment indicated in the segment pathway proximate to one another to create a visual layout similar to that of a film strip.

Once the generation module 113 has finished creating the sequenced video segment mixes, the video serving module 103 displays 511 the sequenced video segment mix mixes to the user via the user interface of the video hosting server 100. A user may select a sequenced video segment mix of interest from the sequenced video segment mixes to view the selected trail mix which is one representation of a video collection related to the search query. The selected sequenced video segment mix is displayed to the user in a user interface such as the user interface shown in previously discussed FIG. 2. As described above, to interact with the sequenced video segment mix, the user may simply hover over a video segment in the sequenced video segment mix with the cursor and the video segment begins to display within the sequenced video segment.

In one embodiment, users may also provide feedback regarding the arrangement of the video segments within a sequenced video segment mix. User feedback can be used by the video hosting server 100 to determine patterns of related video segments across all users who provided feedback. The determined patterns are used to update the ordering of the video segments in sequenced video segment mixes.

In one embodiment, a sequenced video segment mix is dynamically updated during runtime based on a video segment of interest to the user. By selecting a video segment within a sequenced video segment mix for viewing, the video hosting server 100 performs the necessary steps to determine video segments related to the selected video segment. The video hosting server 100 determines a list of related video segments associated with the selected video and constructs a video graph based on the ordering of related video segments described in the list. The sequenced video segment mix is then updated accordingly by the video hosting server 100.

Sequenced video segments are not limited to display responsive to a search query. In one embodiment, the video hosting server 100 displays sequenced video segment mixes when a user first visits the website associated with the video hosting server 100. The sequenced video segment mixes may provide the user a summary of a collection of videos associated with the most popular topic of the hour, day or week, for example. Alternatively, sequenced video segment mixes may be customized based on user preferences indicated in user profiles associated with users of the video hosting server 100. The video hosting server 100 may determine a user's hobbies or interests from the user profiles and display a sequenced video segment mix to the user when the user visits the video hosting server 100 based on the user's hobbies. Generally, anywhere there is a list of videos, the video hosting server 100 can provide a sequenced video segment mix to represent the collection of videos.

The apparatus described above for performing the described operations may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generation sequenced video segment mixes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. On a video hosting site, a computer-implemented method of graphically summarizing video content of a plurality of videos, the method comprising:
    storing videos;
    identifying video segments for the stored videos, each video segment associated with a stored video and representing a frequently watched portion of the associated video;
    receiving a user search query including at least one search term;
    determining a collection of videos that includes video content related to the at least one search term;
    creating a set of video segments by, for each of a plurality of videos in the collection, identifying the video segment that represents a frequently watched portion of the video;
    selecting a first video segment from the set to display in a graphical representation of the collection of videos;
    accessing a count of co-occurring positive interactions for the first video segment and each of a plurality of second video segments from the set of video segments, a co-occurring positive interaction for the first video segment and a second video segment indicating interest of a user in the first video segment and interest of the user in the second video segment within a determined time interval from the interest of the user in the first video segment;
    ordering the plurality of second video segments in the set with respect to the first video segment based on the count of co-occurring positive interactions;

graphically representing the ordered set, the graphical representation including a plurality of aligned cells, each cell representing a video segment from the set; and transmitting the graphical representation for display.

2. The method of claim 1, wherein the first video segment is a video segment from the set with a highest amount of time watched.

3. The method of claim 1, wherein the first video segment is a video segment from the set with a highest user rating.

4. The method of claim 1, wherein the first video segment is a video segment from the set with a highest amount of views.

5. The method of claim 1, wherein the first video segment is a video segment from the set with a highest amount of different users that have viewed the video segment.

6. The method of claim 1, wherein the plurality of cells of the graphical representation visually shift across a user interface and wherein each cell in the graphical representation displays a frame of a video segment from the set.

7. The method of claim 6, further comprising:
responsive to a cursor hovering over a cell for a length of time:
halting the visual shifting of the plurality of cells;
displaying, within the cell, a video segment associated with the cell; and
responsive to the display of the video segment, providing an option to view a full length video associated with the video segment; and
responsive to a user clicking the cell, displaying a full length video associated with the video segment within a video player.

8. The method of claim 1, further comprising:
responsive to a user selection of a video segment, updating the order of the plurality of second video segments in the set based on user interactions between the selected video segment and remaining video segments in the set; and
displaying an updated graphical representation reflecting the updated order.

9. The method of claim 1, wherein ordering the plurality of second video segments in the set is further based on user feedback on the ordered set.

10. The method of claim 1, wherein the method is performed by a video hosting server communicating with a client.

11. The method of claim 1, wherein storing the video segments comprises storing a time marker identifying the frequently watched portion of the video.

12. On a video hosting site, a computer-implemented method of graphically summarizing video content of a plurality of videos, the method comprising:
storing videos;
identifying video segments for the stored videos, each video segment associated with a stored video and representing a frequently watched portion of the associated video;
receiving a request to view the video hosting site;
determining a collection of videos to summarize for a user associated with the request;
creating a set of video segments by, for each of a plurality of videos in the collection, identifying the video segment that represents a frequently watched portion of the video;
selecting a first video segment from the set to display in a graphical representation of the collection of videos;
accessing a count of co-occurring positive interactions for the first video segment and each of a plurality of second video segments from the set of video segments, a co-occurring positive interaction for the first video segment and a second video segment indicating interest of a user in the first video segment and interest of the user in the second video segment within a determined time interval from the interest of the user in the first video segment;
ordering the plurality of second video segments in the set with respect to the first video segment based on the count of co-occurring positive interactions;
graphically representing the ordered set, the graphical representation including a plurality of aligned cells, each cell representing a video segment from the set; and
transmitting the graphical representation for display.

13. The method of claim 12, wherein determining the collection of videos to summarize for the user comprises:
determining interests of the user from the user's profile; and
determining a collection of videos that includes content related to the interests of the user.

14. The method of claim 12, wherein determining the collection of videos to summarize for the user comprises:
determining a popular topic among users of the video hosting site during a determined time interval; and
determining a collection of videos that includes content related to the popular topic.

15. The method of claim 12, wherein the plurality of cells of the graphical representation visually shift across a user interface and wherein each cell in the graphical representation displays a frame of a video segment from the set.

16. The method of claim 15, further comprising:
responsive to a cursor hovering over a cell for a length of time:
halting the visual shifting of the plurality of cells;
displaying, within the cell, a video segment associated with the cell; and
responsive to the display of the video segment, providing an option to view a full length video associated with the video segment;
and
responsive to a user clicking the cell, displaying a full length video associated with the video segment within a video player.

17. The method of claim 12, further comprising:
responsive to a user selection of a video segment, updating the order of the plurality of second video segments in the set based on user interactions between the selected video segment and remaining video segments in the set; and
displaying an updated graphical representation reflecting the updated order.

18. A computer program product for graphically summarizing video content of a plurality of videos on a video hosting site, the computer program product comprising a non-transitory computer-readable storage medium containing computer program code for controlling a processor to perform a method comprising:
storing videos;
identifying video segments for the stored videos, each video segment associated with a stored video and representing a frequently watched portion of the associated video;
receiving a user search query including at least one search term;
determining a collection of videos that includes video content related to the at least one search term;
creating a set of video segments by, for each of a plurality of videos in the collection, identifying the video segment that represents a frequently watched portion of the video;

selecting a first video segment from the set to display in a graphical representation of the collection of videos;

accessing a count of co-occurring positive interactions for the first video segment and each of a plurality of second video segments from the set of video segments, a co-occurring positive interaction for the first video segment and a second video segment indicating interest of a user in the first video segment and interest of the user in the second video segment within a determined time interval from the interest of the user in the first video segment;

ordering the plurality of second video segments in the set with respect to the first video segment based on the count of co-occurring positive interactions;

graphically representing the ordered set, the graphical representation including a plurality of aligned cells, each cell representing a video segment from the set; and transmitting the graphical representation for display.

19. The computer program product of claim 18, wherein the plurality of cells of the graphical representation visually shift across a user interface and wherein each cell in the graphical representation displays a frame of a video segment from the set.

20. The computer program product of claim 18, wherein the method performed by the processor further comprises:
responsive to a cursor hovering over a cell for a length of time:
halting the visual shifting of the plurality of cells;
displaying, within the cell, a video segment associated with the cell; and
responsive to the display of the video segment, providing an option to view a full length video associated with the video segment;
and
responsive to a user clicking the cell, displaying a full length video associated with the video segment within a video player.

21. The computer program product of claim 18, wherein the method performed by the processor further comprises:
responsive to a user selection of a video segment, updating the order of the plurality of second video segments in the set based on user interactions between the selected video segment and remaining video segments in the set; and
displaying an updated graphical representation reflecting the updated order.

22. A computer program product for graphically summarizing video content of a plurality of videos on a video hosting site, the computer program product comprising a non-transitory computer-readable storage medium containing computer program code for controlling a processor to perform a method comprising:
storing videos;
identifying video segments for the stored videos, each video segment associated with a stored video and representing a frequently watched portion of the associated video;
receiving a request to view the video hosting site;
determining a collection of videos to summarize for a user associated with the request;
creating a set of video segments by, for each of a plurality of videos in the collection, identifying the video segment that represents a frequently watched portion of the video;
selecting a first video segment from the set to display in a graphical representation of the collection of videos;
accessing a count of co-occurring positive interactions for the first video segment and each of a plurality of second video segments from the set of video segments, a co-occurring positive interaction for the first video segment and a second video segment indicating interest of a user in the first video segment and interest of the user in the second video segment within a determined time interval from the interest of the user in the first video segment;
ordering the plurality of second video segments in the set with respect to the first video segment based on the count of co-occurring positive interactions;
graphically representing the ordered set, the graphical representation including a plurality of aligned cells, each cell representing a video segment from the set; and
transmitting the graphical representation for display.

23. The computer program product of claim 22, wherein determining the collection of videos to summarize for the user comprises:
determining interests of the user from the user's profile; and
determining a collection of videos that includes content related to the interests of the user.

24. The computer program product of claim 22, wherein determining the collection of videos to summarize for the user comprises:
determining a popular topic among users of the video hosting site during a determined time interval; and
determining a collection of videos that includes content related to the popular topic.

25. The computer program product of claim 22, wherein the plurality of cells of the graphical representation visually shift across a user interface and wherein each cell in the graphical representation displays a frame of a video segment from the set.

26. The computer program product of claim 22, wherein the method performed by the processor further comprises:
responsive to a cursor hovering over a cell for a length of time:
halting the visual shifting of the plurality of cells;
displaying, within the cell, a video segment associated with the cell; and
responsive to the display of the video segment, providing an option to view a full length video associated with the video segment;
and
responsive to a user clicking the cell, displaying a full length video associated with the video segment within a video player.

27. The computer program product of claim 22, wherein the method performed by the processor further comprises:
responsive to a user selection of a video segment, updating the order of the plurality of second video segments in the set based on user interactions between the selected video segment and remaining video segments in the set; and
displaying an updated graphical representation reflecting the updated order.

28. A computer system for graphically summarizing video content of a plurality of videos on a video hosting site, the system comprising:
a computer processor; and
a computer-readable storage medium storing executable code configured to execute on the computer processor, the code when executed performs steps comprising:
storing videos;
identifying video segments for the stored videos, each video segment associated with a stored video and representing a frequently watched portion of the associated video;
receiving a user search query including at least one search term;

determining a collection of videos that includes video content related to the at least one search term;

creating a set of video segments by, for each of a plurality of videos in the collection, identifying the video segment that represents a frequently watched portion of the video;

selecting a first video segment from the set to display in a graphical representation of the collection of videos;

accessing a count of co-occurring positive interactions for the first video segment and each of a plurality of second video segments from the set of video segments, a co-occurring positive interaction for the first video segment and a second video segment indicating interest of a user in the first video segment and interest of the user in the second video segment within a determined time interval from the interest of the user in the first video segment;

ordering the plurality of second video segments in the set with respect to the first video segment based on the count of co-occurring positive interactions;

graphically representing the ordered set, the graphical representation including a plurality of aligned cells, each cell representing a video segment from the set; and transmitting the graphical representation for display.

29. The system of claim 28, wherein the plurality of cells of the graphical representation visually shift across a user interface and wherein each cell in the graphical representation displays a frame of a video segment from the set.

30. The system of claim 28, wherein the code when executed performs further steps comprising:

responsive to a cursor hovering over a cell for a length of time:
halting the visual shifting of the plurality of cells;
displaying, within the cell, a video segment associated with the cell; and
responsive to the display of the video segment, providing an option to view a full length video associated with the video segment;
and
responsive to a user clicking the cell, displaying a full length video associated with the video segment within a video player.

31. The system of claim 28, wherein the code when executed performs further steps comprising:

responsive to a user selection of a video segment, updating the order of the plurality of second video segments in the set based on user interactions between the selected video segment and remaining video segments in the set; and
displaying an updated graphical representation reflecting the updated order.

32. A computer system for graphically summarizing video content of a plurality of videos on a video hosting site, the system comprising:

a computer processor; and
a computer-readable storage medium storing executable code configured to execute on the computer processor, the code when executed performs steps comprising:
storing videos;
identifying video segments for the stored videos, each video segment associated with a stored video and representing a frequently watched portion of the associated video;

receiving a request to view the video hosting site;

determining a collection of videos to summarize for a user associated with the request;

creating a set of video segments by, for each of a plurality of videos in the collection, identifying the video segment that represents a frequently watched portion of the video;

selecting a first video segment from the set to display in a graphical representation of the collection of videos;

accessing a count of co-occurring positive interactions for the first video segment and each of a plurality of second video segments from the set of video segments, a co-occurring positive interaction for the first video segment and a second video segment indicating interest of a user in the first video segment and interest of the user in the second video segment within a determined time interval from the interest of the user in the first video segment;

ordering the plurality of second video segments in the set with respect to the first video segment based on the count of co-occurring positive interactions;

graphically representing the ordered set, the graphical representation including a plurality of aligned cells, each cell representing a video segment from the set; and transmitting the graphical representation for display.

33. The system of claim 32, wherein the code when executed performs further steps comprising:

determining interests of the user from the user's profile; and
determining a collection of videos that includes content related to the interests of the user.

34. The system of claim 32, wherein the code when executed performs further steps comprising:

determining a popular topic among users of the video hosting site during a determined time interval; and
determining a collection of videos that includes content related to the popular topic.

35. The system of claim 32, wherein the plurality of cells of the graphical representation visually shift across a user interface and wherein each cell in the graphical representation displays a frame of a video segment from the set.

36. The system of claim 31, wherein the code when executed performs further steps comprising:

responsive to a cursor hovering over a cell for a length of time:
halting the visual shifting of the plurality of cells;
displaying, within the cell, a video segment associated with the cell; and
responsive to the display of the video segment, providing an option to view a full length video associated with the video segment;
and
responsive to a user clicking the cell, displaying a full length video associated with the video segment within a video player.

37. The system of claim 32, wherein the code when executed performs further steps comprising:

responsive to a user selection of a video segment, updating the order of the plurality of second video segments in the set based on user interactions between the selected video segment and remaining video segments in the set; and
displaying an updated graphical representation reflecting the updated order.

* * * * *